United States Patent [19]

Hellstern et al.

[11] Patent Number: 5,200,465

[45] Date of Patent: * Apr. 6, 1993

[54] IMPACT MODIFICATION OF POLYIMIDES

[75] Inventors: AnnMarie Hellstern, Clifton Park; Robert J. Halley, Schenectady; Linda L. Mitchell, Delmar, all of N.Y.; I-Chung W. Wang, Vienna, W. Va.

[73] Assignee: General Electric Company, Schenectady, N.Y.

[*] Notice: The portion of the term of this patent subsequent to Jul. 3, 2007 has been disclaimed.

[21] Appl. No.: 627,515

[22] Filed: Dec. 11, 1990

Related U.S. Application Data

[63] Continuation-in-part of Ser. No. 271,250, Nov. 14, 1988, Pat. No. 5,045,595.

[51] Int. Cl.$^5$ .............................................. C08L 51/08
[52] U.S. Cl. ......................................... 525/66; 525/63; 525/426; 525/431
[58] Field of Search ..................... 525/63, 426, 431, 66

[56] References Cited

U.S. PATENT DOCUMENTS

| | | | |
|---|---|---|---|
| 2,891,920 | 6/1959 | Hyde et al. | 528/15 |
| 3,220,972 | 11/1965 | Lamoreaux | 528/15 |
| 3,775,452 | 11/1973 | Karstedt | 528/15 |
| 3,898,300 | 8/1975 | Hilliard | 525/479 |
| 4,071,577 | 1/1978 | Falender et al. | 525/479 |
| 4,226,761 | 10/1980 | Cooper et al. | 525/63 |
| 4,564,653 | 1/1986 | Kamata et al. | 525/67 |
| 4,812,515 | 3/1989 | Kress et al. | 525/69 |
| 4,902,742 | 2/1990 | Yamamoto | 525/63 |
| 4,939,205 | 7/1990 | Derudder | 525/63 |
| 4,939,206 | 7/1990 | Wang | 525/63 |
| 4,945,124 | 7/1990 | Westeppe | 525/63 |
| 5,045,595 | 9/1991 | Wang et al. | 525/66 |

FOREIGN PATENT DOCUMENTS

| | | |
|---|---|---|
| 51471 | 5/1980 | European Pat. Off. |
| 166900 | 1/1986 | European Pat. Off. |
| 217257 | 4/1987 | European Pat. Off. |
| 231776 | 8/1987 | European Pat. Off. |
| 246537 | 11/1987 | European Pat. Off. |
| 249964 | 12/1987 | European Pat. Off. |
| 260552 | 3/1988 | European Pat. Off. |
| 61-235462 | 10/1986 | Japan ........................ 525/63 |
| 1590549 | 3/1981 | United Kingdom . |

OTHER PUBLICATIONS

Graiver et al., Rubber Chemistry & Technology, 56, 918-926 (1983).

Primary Examiner—Ralph H. Dean, Jr.
Attorney, Agent, or Firm—Wiliam H. Pittman

[57] ABSTRACT

The impact resistance of polyimides is improved by the addition of impact modifiers comprising, as a first stage, an elastomeric polydiorganosiloxane optionally polymerized simultaneously with but separately from one or more vinyl monomers, and as at least one grafted subsequent stage a polymer or copolymer of acrylonitrile, methacrylonitrile, a vinyl aromatic compound, (meth)acrylic acid, alkyl (meth)acrylate or (meth)acrylamide monomer.

15 Claims, 4 Drawing Sheets

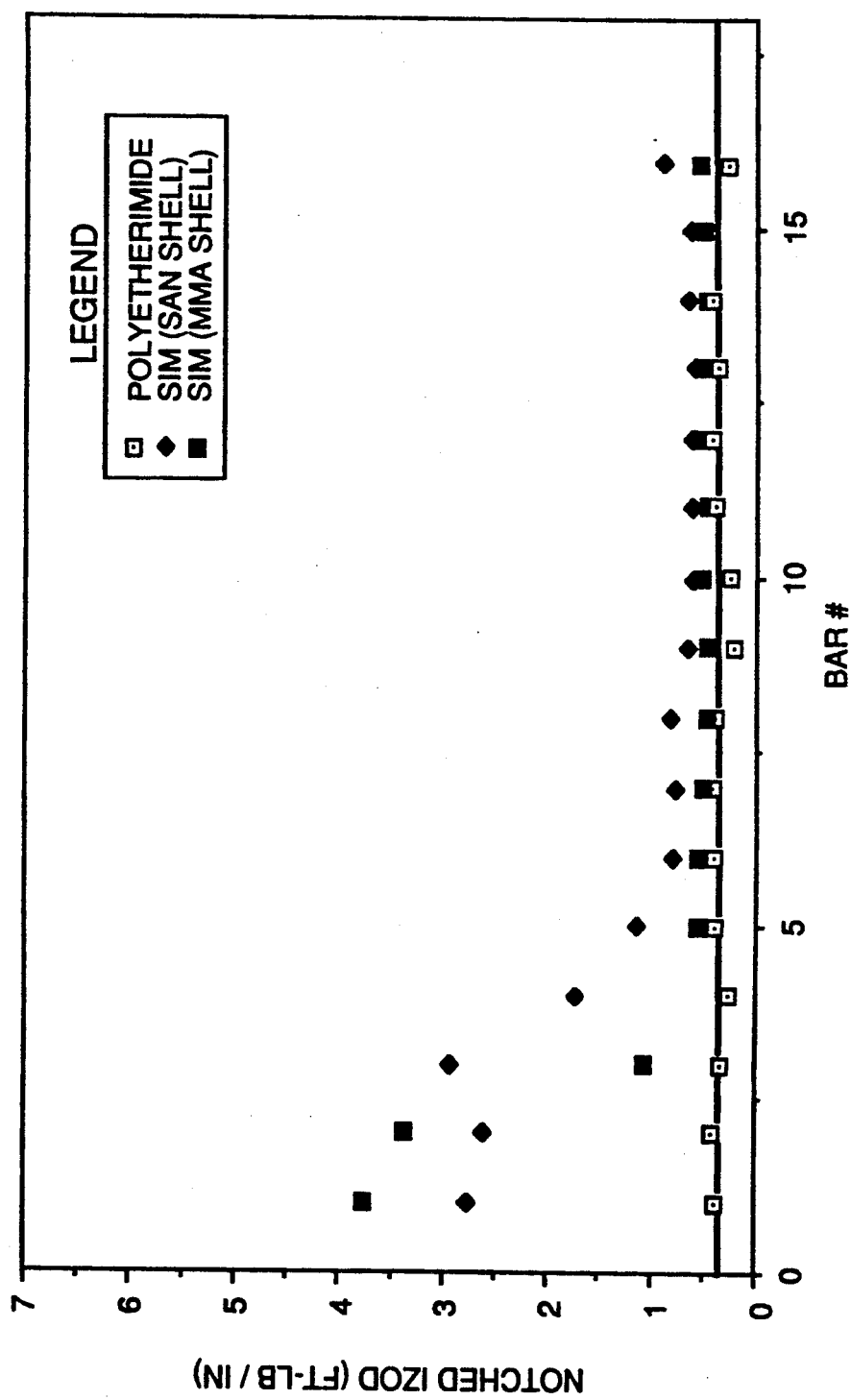

IMPACT MODIFICATION OF POLYIMIDES

This application is a continuation-in-part of the application of I-Chung Wayne Wang, filed Nov. 14, 1988 Ser. No. 07/271,250, now U.S. Pat. No. 5,045,595, the disclosure of which is hereby incorporated by reference.

The present invention relates to polyimides containing impact modifiers.

Polyimide materials in the form of moldings are useful in bearings, electrical conductor insulation and printed circuits. Polyimides can also be reinforced with glass and carbon fibers and used in aerospace applications as aircraft skins or honeycomb structural members. Polyimides are well known for their superior mechanical and dielectric properties and chemical stability at high temperatures. In addition to a broad range of polyimides, there are also many imide copolymers, such as polyamideimides, polyesterimides, polyetherimides, polycarbonate imides, polythioesterimides, polyketoneimides and the like.

The polyimides, the imide copolymers and the methods of making such polymers are known in the art and will not be discussed in detail. Examples of polyimides, imide copolymers and methods of manufacture are disclosed in Polyimides: Progress in Materials Science, Volume 7, 1977 by Androva and U.S. Pat. Nos. 3,666,709, 3,817,927, 3,847,867, 4,111,906, 4,588,804, 4,586,997, 4,620,497, 4,634,760, 4,701,511 and 4,820,781 which are hereby incorporated by reference. Polyimides, imide copolymers and methods of manufacture are also disclosed in many other patent and literature references. The list of patents relating to polyimides is neither representative nor inclusive of the polyimide and imide copolymer art.

While polyimides have a broad range of desirable properties, polyimides and to a lesser degree imide copolymers are lacking in impact resistance. Improvement in impact properties is difficult due to the instability of impact modifiers at the temperatures required for the processing and extrusion of polyimides.

The present invention is based upon the discovery that a polydiorganosiloxane-based impact modifier (SIM) having a grafted structure can effectively improve the impact strength of the polyimide. More particularly, there is employed a graft polymer preferably prepared by emulsion polymerization, said polymer having an elastomeric polydiorganosiloxane first stage and at least one subsequent grafted stage comprising specific vinyl monomer-derived structural units.

In one of its aspects, the invention includes compositions comprising a polyimide in combination with a sufficient amount to improve the impact resistance of the polyimide, usually 3-20% and preferably 5-15% based on total composition, of an impact modifier comprising a graft polymer having: (a) an elastomeric polydiorganosiloxane as the first stage and (b) at least one subsequent stage graft polymerized in the presence of any previous stages, said subsequent graft polymerized stage comprising polymers selected from the group consisting of copolymers of acrylonitrile with vinyl aromatic monomers, copolymers of methacrylonitrile with vinyl aromatic monomers, homopolymers of vinyl aromatic monomers, homopolymers and copolymers of lower alkyl acrylates or methacrylates, homopolymers and copolymers of acrylamide or methacrylamide and homopolymers and copolymers of acrylic acid or methacrylic acid.

Most of the known preimidized polyimides can be described by a general formula of a repeating unit which contains two cyclic imide rings. For example, see the definition of polyimides in U.S. Pat. No. 4,485,140. These polyimides are defined as condensation type polymers having structural units of the formula

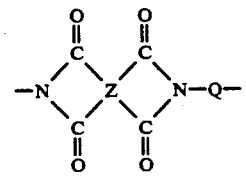

where Z is a suitable tetravalent organic radical, which may be a simple structure such as that derived from the benzene ring or a more complex structure such as that derived from benzophenone, or any other appropriate, usually aromatic, tetravalent organic radical; and Q is a divalent organic radical. Further detail is disclosed in the aforementioned U.S. Pat. No. 4,485,140 which is hereby incorporated by reference.

There are some polymers which can be represented by a repeating unit which contains only one cyclic imide ring. An example of such a repeating unit is

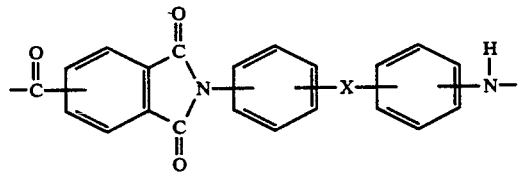

where X is O, S, or $(CH_2)_m$ and m has a value of from 0 to 6. The unassigned bonds to the aromatic rings can be in any available position. The benzene rings can be substituted with alkyl or halogen.

U.S. Pat. No. 3,847,867, which patent is hereby incorporated by reference, discloses polyetherimides made by reacting an aromatic bis(ether anhydride) and an organic diamine in the presence of an organic solvent at temperatures of at least 130° C. Such polyetherimides consist essentially of chemically combined units of the formula

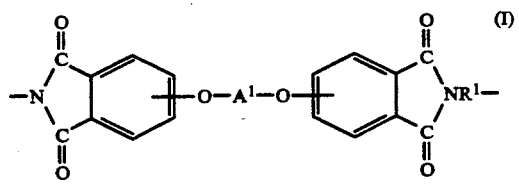

where $A^1$ is a divalent aryl radical including bis-aryl radicals and can be substituted with methyl and bromine radicals. The two aryl radicals of the bis-aryl radical can be joined by a covalent bond or by one or more divalent radicals of the formulas

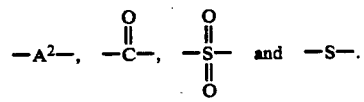

The divalent bonds of the —O—A—O— radical are usually equally situated on the phthalimide end groups, e.g., in the 3,3' positions or the 4,4' positions. $A^2$ is an alkylene radical having from 1 to 5 carbon atoms. $R^1$ is a divalent organic radical selected from the class consisting of (a) aromatic hydrocarbon radicals having from 6-20 carbon atoms and halogenated derivatives thereof, (b) alkylene radicals and cycloalkylene radicals having from 2-20 carbon atoms, and (c) divalent radicals included by the formula

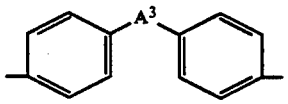

where $A^3$ is selected from the class consisting of

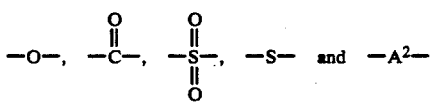

where $A^2$ is as previously defined.

U.S. Pat. No. 3,905,942 also discloses a corresponding high temperature method for making polyimides from the corresponding tetracarboxylic acids.

U.S. Pat. No. 3,818,927 discloses polyimides prepared by condensing a tetracarboxylic acid of the formula

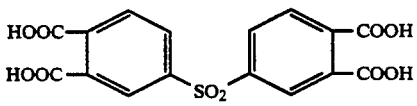

or a derivative thereof which forms amido groups with 4,4'-diaminobenzophenone in a polar organic solvent at a temperature above 160° C.

U.S. Pat. No. 4,111,906 discloses polyimides prepared from perfluoroisopropylidene diamine. The polyimides can be illustrated by the idealized formula

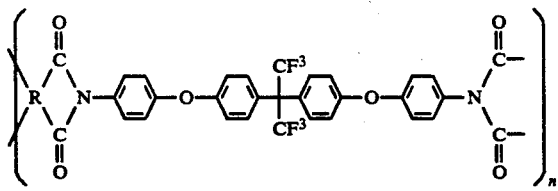

wherein n is an integer sufficient to provide a structure having an average molecular weight of at least 5000 and $R^3$ is an organic radical of 5 to 22 atoms which may be an aliphatic or alicyclic radical or an organic radical having one or more benzene rings or fused aromatic rings.

The present invention also has applicability to the stronger, less impact resistant, highly solvent resistant polyimides and copolyimides such as those disclosed in U.S. Pat. Nos. 4,247,443 and 4,290,936. Examples and copolyimides are also shown in U.S. Pat. No. 4,634,760, incorporated herein by reference. Such polyimides and copolyimides contain structural units having the formula

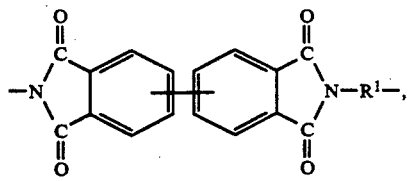

wherein $R^1$ is as previously defined, optionally in combination with structural units having formula I.

In general, the polyamic acids are useful as intermediates for the polyimides when the latter are prepared by the reaction of a dianhydride with a diamine as is described in U.S. Pat. No. 4,634,760 which is hereby incorporated by reference. Polyimides in general can be prepared from polyamic acids or by the reaction of diamines with bisimides having electron-deficient N-substituents, as more fully described hereinafter. Because the polyimide precursors are most often dianhydrides, frequent reference to dianhydrides will be made hereinafter.

The preferred polyimides are derived from 2,2-bis[4-(3,4-dicarboxyphenoxy)phenyl]propane dianhydride (also known as bisphenol A dianhydride) the corresponding tetracarboxylic acid, its 2,3-dicarboxy and mixed 2,3- and 3,4-dicarboxyphenoxy isomers and mixtures thereof, with bisphenol A dianhydride being preferred.

Examples of suitable $R^1$ values are those in such diamines as ethylenediamine, propylenediamine, trimethylenediamine, diethylenetriamine, triethylenetetramine, heptamethylenediamine, octamethylenediamine, 2,11-dodecanediamine, 1,12-octadecanediamine, 3-methylheptanethlyenediamine, 4,4-dimethylheptamethylenediamine, 4-methylnonamethylenediamine, 2,5-dimethylhexamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, benzidine, 3,3'-dimethoxybenzidene, 1,5-diaminonaphthalene, bis(4-aminophenyl)methane, bis(4-aminophenyl)propane, 2,4-bis($\beta$-amino-t-butyl)toluene, bis(p-$\beta$-methyl-o-aminopentyl)benzene, 1,3-diamino-4-isopropylbenzene, bis(4-aminophenyl)sulfone and bis(4-aminophenyl) ether. Mixtures of these $R^1$ values may also be present. Preferably, $R^1$ is an aromatic hydrocarbon radical; the m-phenylene and bis(4-phenylene)methane radicals are particularly preferred.

Methods for the preparation of polyimides by the reaction of tetracarboxylic acids or their esters or dianhydrides with diamines or diisocyanates are known in the art. A somewhat different method, comprising the reaction of a diamine with a tetracarboxylic acid bisimide of an amine containing an electron-deficient radical, is disclosed in U.S. Pat. No. 4,578,470, the disclosure of which is incorporated by reference herein.

When a dianhydride is used as the reactant, an initial reaction to form a polymer containing predominantly amic acid groups may occur at temperatures as low as about 25° C. In general, temperatures no higher than about 100° C. are required for polyamic acid formation. Substantially complete conversion to polyimide generally takes place at temperatures up to about 250° C., most often about 235°-200° C. It may, under certain circumstances, be desirable to obtain and isolate the polyamic acid as an intermediate in polyimide formation. If so, the reaction temperature should be regulated accordingly. If polyamic acid formation is not desired, the reaction mixture may simply be heated at a temperature within the range of about 150°-400° C., preferably about 250°-350° C., until the reaction is complete.

Polymerization may be effected in solution in a suitable solvent, typically a polar aprotic solvent such as dimethylformamide, dimethylacetamide, dimethyl sulfoxide or N-methylpyrrolidone. Aromatic hydrocarbons such as toluene or xylene and hydroxylated or chlorinated aromatic hydrocarbons such as phenol, m-cresol, chlorobenzene or o-dichlorobenzene may also be employed as solvents, usually in the presence of a phase transfer catalyst. Mixtures of these solvents may also be used. For polyimide formation, the use of a mixture containing at least one solvent which forms an azeotrope with water (e.g., toluene), usually in an amount up to about 20% by weight, may be advantageous. The reaction may also be effected in bulk, typically by the use of extrusion and/or wiped film techniques or the like. Copolyimides containing more than about 40 mole percent of units of formula I are generally most conveniently prepared in bulk.

The mole ratio of diamine to dianhydride or bisimide is generally between about 0.9:1 and about 1.2:1. In general, polymers of higher molecular weight are obtained by employing ratios equal to or very close to 1:1. As used in this specification, the equivalent weight of a diamine, dianhydride or bisimide is half its molecular weight.

It is advisable in some instances to include in the reaction mixture chainstopping agents, typically monofunctional aromatic amines such as aniline or monoanhydrides such as phthalic anhydride. They are usually present in the amount of about 1-5 mole percent of total anhydride or amine constituents, as appropriate. Metal carboxylates or oxygenated phosphorus compounds may also be present as catalysts in accordance with U.S. Pat. Nos. 4,293,683 and 4,324,882, the disclosures of which are incorporated by reference herein.

The weight average molecular weights of the polyimides containing structural units of formula I are generally within the range of about 5,000-100,000 and most often about 10,000-50,000.

As impact modifiers, there are employed according to this invention graft polymers containing a polydiorganosiloxane first stage and at least one subsequent stage comprising structural units selected from the group consisting of vinyl aromatic, meth(acrylonitrile), alkyl (meth)acrylate, (meth)acrylamide and (meth)acrylic acid units. By (meth)acrylonitrile is meant acrylonitrile and methacrylonitrile. By alkyl (meth)acrylate is meant alkyl esters of both acrylic acid and methacrylic acid. By (meth)acrylamide is meant acrylamide and methacrylamide. By (meth)acrylic acid is meant acrylic acid and methacrylic acid.

In the description hereinafter, the product of first-stage grafting will frequently be identified as the "substrate" to clarify the fact that two discrete polymerization stages are required for the preparation of the impact modifier. The first stage includes the preparation of a polydiorganosiloxane and optionally also of a vinyl monomer-derived polymer, the latter being simultaneously produced but being a separate polymer from the polydiorganosiloxane. The second stage includes preparation of another vinyl monomer-derived polymer grafted on the substrate produced in the first stage.

The preferred subsequent stages for use when the molten resin sustains a long residence time at high temperatures (e.g., at least 5 minutes at 370° C. average molding barrel set) during molding are copolymers of either acrylonitrile or methacrylonitrile. Examples are set forth below. The (meth)acrylamide and lower alkyl (meth)acrylate-containing subsequent stages are generally preferably used at temperatures of less than 300° C. if the temperature is to be maintained for long residence times. Some decomposition does take place in some instances.

The grafted impact modifiers useful in the present invention include both materials formed from bonding, i.e., grafting between functional sites in the first and subsequent stages, and materials in which polymeric chains of the first stage are entangled with those of the subsequent stage(s), without chemical reaction.

The impact modifiers have a low Tg first stage comprised of polydiorganosiloxane and at least one subsequent stage, preferably having a higher Tg than the first stage. Vinyl monomer-derived polymers having Tg's below 25° C. can also be employed as subsequent stage materials provided there are multiple subsequent stages. The subsequent stage is preferably a copolymer of a (meth)acrylonitrile with a vinyl aromatic monomer. A vinyl aromatic monomer can also be used to form a subsequent stage. Other monomers which can be used to form the subsequent stage include (meth)acrylamide and alkyl (meth)acrylates such as methyl (meth)acrylate.

The first stage material is typically an elastomeric crosslinked polydiorganosiloxane. Polydiorganosiloxane elastomers and related impact modifiers are disclosed in U.S. Pat. Nos. 2,891,920, 4,690,986, 4,748,215, 4,812,515 and 4,894,415; British Patent 1,590,549; and European Patent Applications 105,226, 106,845 and 108,701, all of which are hereby incorporated by reference.

The polydiorganosiloxane elastomer in the first stage preferably has a glass transition temperature below —40° C. The polydiorganosiloxane elastomer may contain units of the formulas

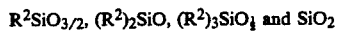

$R^2SiO_{3/2}$, $(R^2)_2SiO$, $(R^2)_3SiO_{\frac{1}{2}}$ and $SiO_2$ wherein $R^2$ represents a monovalent radical. It is not essential that all of the above units be present in the polydiorganosiloxane. The amounts of the individual diorganosiloxane units may range from 0 to 10 units of $R^2SiO_{3/2}$, 0 to 1.5 units of $(R^2)_3SiO_{\frac{1}{2}}$ and 0 to 3 units of $SiO_2$ per 100 units of $(R^2)_2SiO$.

The $R^2$ radical may be a monovalent hydrocarbon radical having 1 to 18 carbon atoms or a corresponding substituted hydrocarbon radical and is usually methyl or phenyl. The hydrocarbon and substituted hydrocarbon radicals are well known in the art and will not be described in detail. In addition, it is preferred that a limited number of $R^2$ groups contain vinyl, mercaptoalkyl radicals to facilitate the grafting of the subsequent stage onto the elastomeric polydiorganosiloxane stage. Particularly preferred for facilitating grafting are $R^2$ groups containing acrylic and/or methacrylic radicals. The ratio of radicals which facilitate grafting may range from 0.0001 to 0.6, preferably 0.001 to 0.02 per diorganosiloxane unit in the elastomeric polydiorganosiloxane.

Vinyl monomers free from silicon can be polymerized simultaneously with the polydiorganosiloxane in the first stage, to form the substrate. Preferred vinyl monomers include styrene and mixtures of styrene and acrylonitrile comprising about 50-99% styrene units. Other vinyl aromatic monomers may also be used including methylstyrene, vinyltoluene, vinylnaphthalene, vinylanthracene and halogenated styrenes or their derivatives. Other suitable vinyl monomers include (meth)acrylic acids and (meth)acrylates, such as methyl, ethyl, allyl and butyl acrylate, methyl methacrylate and 2-ethylhexyl acrylate. The monomers can be used alone or mixed.

Crosslinkers and graftlinkers may also be present, preferably at a level of 0.5 to 3% of the vinyl monomer/cross- or graftlinker mixture. Crosslinkers and graftlinkers include divinylbenzene, diallyl maleate and any of the other divinyl or polyvinyl compounds known in the art.

The vinyl monomers, if any, preferably constitute from 0% to 45% of the active polymerizable ingredients forming the first stage, more preferably from 5 to 25%.

The ingredients for preparation of the first stage are polymerized in aqueous emulsion. The initiator for the vinyl monomers can be any organic soluble radical initiator, such as azobisisobutyronitrile and an organic peroxide, e.g., benzoyl peroxide, dichlorobenzoyl peroxide or t-butyl perbenzoate. Also suitable are water soluble radical initiators such as the persulfates. Particle size, pH and total solids measurements can be readily monitored at this stage of the process. The particle size may be controlled by homogenization pressure, the number of passes through a homogenizer, surfactant concentration and/or the composition of the reaction ingredients.

The polydiorganosiloxane component of the first stage substrate may be crosslinked by using any of the conventional methods for crosslinking polydiorganosiloxane chains. These methods include using silanes having 3 or 4 hydrolyzable alkoxy groups in the formation of the polydiorganosiloxane chain or crosslinking the polydiorganosiloxane chains through reactive groups on the chains. These methods are well known in the art. The hydrolysis and condensation of the alkoxy silanes to form crosslinked polydiorganosiloxanes and, optionally, the vinyl polymerization to form the first stage are preferably done in an aqueous medium. Formation of the polydiorganosiloxane by ring opening of a cyclic polydiorganosiloxane followed by equilibration is an acid- or base-catalyzed reaction. Surfactants such as dodecylbenzenesulfonic acid function to catalyze the polydiorganosiloxane polymerization and to stabilize the latex formed, frequently eliminating the need for separate catalysts and surfactants.

Preferably the polydiorganosiloxane polymerization is quenched by neutralization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to at least about 6.5 and preferably 6.5 to 9. The neutralization step is preferred but not required.

After polymerization, which forms the first stage substrate particles suspended in the aqueous medium as a latex, the latex is preferably neutralized to a pH of at least 7.5.

The foregoing process produces an elastomeric polydiorganosiloxane substrate, optionally also containing silicon-free polyvinyl chains. This substrate is the first stage of the impact modifier employed in the present invention. The next stage involves the graft polymerization of at least one vinyl monomer, preferably a thermally stable vinyl monomer, onto the elastomeric polydiorganosiloxane substrate latex formed in the initial polymerization.

Suitable monomers for grafting to form one or more subsequent stages on the elastomeric polydiorganosiloxane first-stage substrate are vinyl aromatic monomers such as styrene; the side-chain-substituted styrenes, e.g., α-methylstyrene; the nuclear-alkylated styrenes, e.g., vinyltoluene; the halogenated styrenes such as α-bromostyrene; acrylonitrile and/or methacrylonitrile; and mixtures of these monomers. Other monomers include the lower alkyl (meth)acrylates such as methyl methacrylate, ethyl acrylate, butyl acrylate, n-butyl methacrylate and (meth)acrylamide; (meth)acrylic acid and (meth)acrylonitrile. Mixtures of said monomers may be employed. The subsequent stage also preferably contains on a weight basis from 0.5 to 3%, based on active ingredient, of a crosslinking agent such as divinylbenzene. Other crosslinking agents include the same divinyl, silicon-free monomers used as crosslinkers and graftlinkers in the first stage.

Preferably, monomer mixtures of styrene and acrylonitrile are employed for the subsequent stage(s) with the acrylonitrile content of these mixtures preferably being up to 50% by weight based upon the two components and the styrene content being from 50% to 100% by weight. The styrene may be replaced entirely or in part by one or more other vinyl aromatic monomers and the acrylonitrile may be replaced entirely or in part by methacrylonitrile.

The impact modifiers are made by polymerizing a subsequent stage of from 1% to 70% by weight of vinyl monomer or monomer mixture in the presence of from 30% to 99% of the elastomeric polydiorganosiloxane first-stage substrate. Preferably from 20% to 50% by weight of vinyl monomer or monomer mixture is polymerized in the presence of 50% to 80% of the substrate. One or more intermediate subsequent stages can be positioned between the substrate and the subsequent grafted stage. Such intermediate stages and the methods of making them are known in the art. See, for example, the parent Wang application and the cited background art which have been incorporated by reference. The procedure for making the intermediate stage(s) generally follows the procedure set forth for making the final stage.

The graft polymerization to form the final stage may be carried out in a conventional manner, preferably by emulsion polymerization. The conventional polymerization additives; e.g., free radical initiators, chain termination agents, dispersants and the like, may be used for the graft polymerization. In such a process, the monomers are uniformly added to the substrate particles, which should be present in latex form, and are then polymerized at from 30° C. to 100° C., preferably from 40° C. to 80° C. Conventional initiators, e.g., organic water-soluble peroxides, percarbonates, persulfates, perborates, redox catalysts, benzoyl peroxide, dicumyl peroxide or di-t-butyl peroxide or azobisisobutyronitrile, are typically employed. The initiators are used in concentrations of from 0.1% to 5% by weight. Anionic, cationic, amphoteric and non-ionic emulsifiers, such as alkyl sulfates, may also be employed to further stabilize the latex.

In the drawings,

FIG. 4 is a graph similar to FIG. 3 for a period of 10 minutes.

Figure 1:
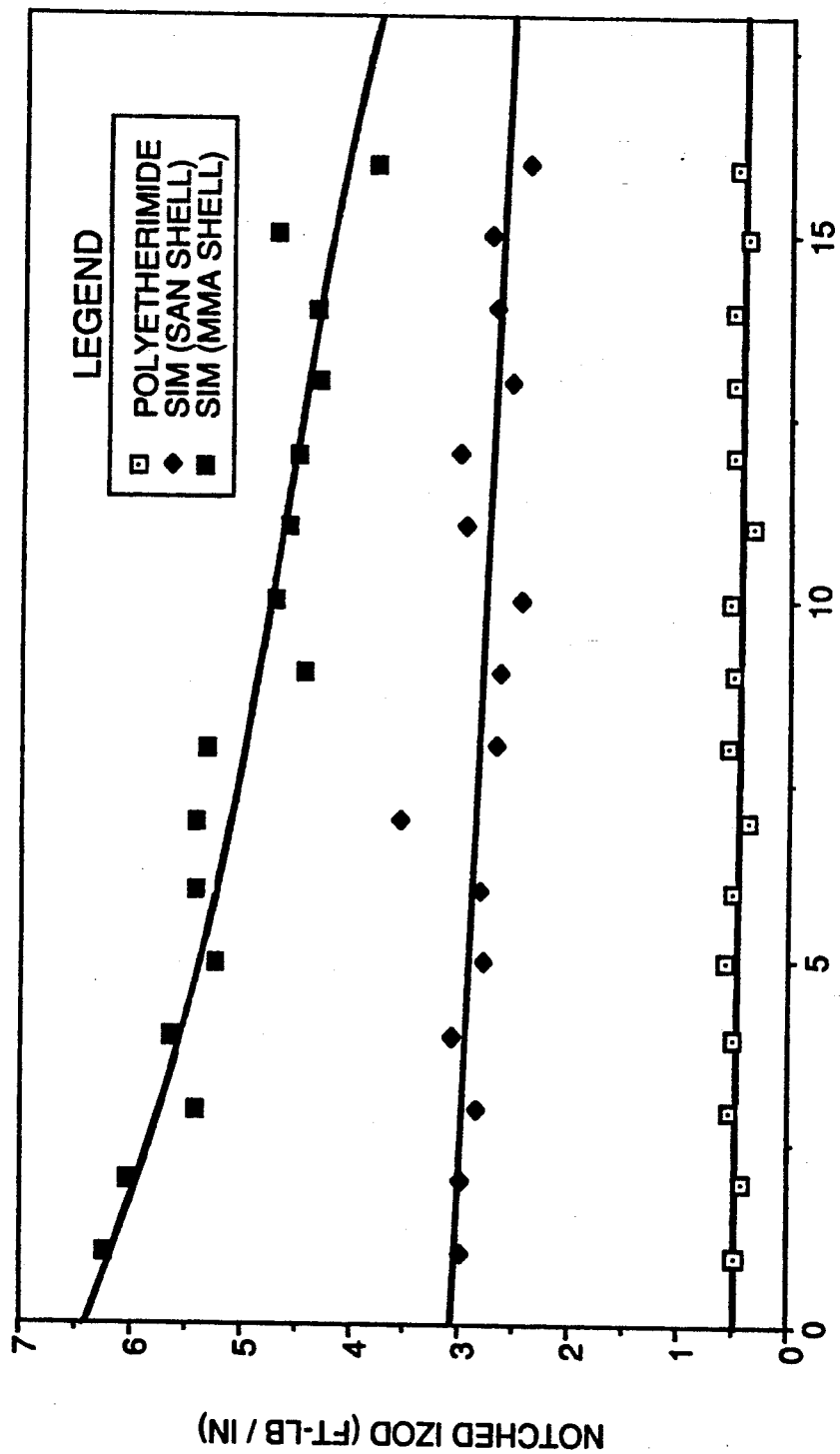
FIG. 1 is a graph comparing the impact resistance of a commercially available polyetherimide with the impact resistance of compositions of this invention at 343° C. for 2.66 minutes.

In the examples that follow, all parts and percentages are by weight unless otherwise indicated. The physical test results obtained from the materials prepared in the examples are set forth in the tables following the examples and in the figures. The polyetherimide employed was a commercially available product prepared from bisphenol A dianhydride and m-phenylenediamine; it had an intrinsic viscosity of 0.45 dl./gm. in CHCl$_3$ at 25° C. The divinylbenzene had an activity of 55%, the remainder being a mixture of isomers. The term "monomer", when used to define a diorganosiloxane unit, includes polymerizable cyclic trimers and cyclic tetramers. The specimen test procedures used in establishing data were as follows:

The notched Izod impact test utilized a $\frac{1}{8}"\times\frac{1}{2}"\times 2.5"$ specimen and was run according to the procedure set forth in ASTM D-256. The Dynatup test utilized drop dart energy to fracture a $\frac{1}{8}"\times 4"$ disk specimen with results in (in.-lb.). The heat deflection temperature (°F.) was run using a $\frac{1}{8}"\times\frac{1}{2}"\times 5"$ specimen according to the procedure set forth in ASTM D-648. The results were converted to °C.

EXAMPLE 1

This example illustrates one embodiment of the silicone-based impact modifiers employed according to this invention and how to prepare the same.

A reaction vessel, equipped with a stirrer, reflux condenser, thermometer, one feed port and a heating mantle was charged with 69.35 parts deionized water, 0.36 parts dodecylbenzenesulfonic acid and 29.38 parts of a monomer mixture which contained 25.88 parts of a polydiorganosiloxane-forming mixture containing, by weight, 84.7 parts octamethylcyclotetrasiloxane, 9.8 parts tetraethoxysilane, 1.4 parts methacryloxypropyltriethoxysilane, 4 parts 2,4,6,8-tetramethyltetravinylcyclotetrasiloxane and 3.5 parts of a vinyl monomer mixture containing, by weight, 98 parts styrene and 2 parts divinylbenzene. The above mixture was stirred and homogenized by passing the filtered solution through a Microfluidics Corp. M100T homogenizer under a pressure of 7600–8400 psi. and returning the mixture to the reactor.

The temperature was raised to 75° C. via the heating mantle while the mixture was stirred under a nitrogen purge. Stirring was continuous throughout the reaction from this point on. At the temperature of reaction, 75° C., purging was ceased, though a blanket of inert atmosphere was maintained. Subsequently, 0.18 part of a 2% aqueous solution of potassium persulfate (KPS) was charged to the vessel. Aqueous potassium persulfate was charged incrementally in aliquots of equal parts at the end of hours 1, 2, 3 and 4 for a total addition of 0.90 parts of the 2% aqueous KPS solution. The reaction temperature was maintained at 75° C. for two additional hours after the final charge of the aqueous KPS solution. The reaction was allowed to slowly cool under ambient conditions and was maintained at room temperature for a total of 18 hours in the stirred reactor. After 18 hours equilibration time at 20°–30° C., 0.21 parts of an aqueous mixture containing, by weight, 10 parts of a surfactant, GAFAC RE610 (GAF Corporation, Wayne, N.J.) and 90 parts deionized water was charged to the reactor. The resulting latex was then titrated to a pH of 7.5 with a 15% aqueous solution of potassium carbonate.

The stirred, titrated latex was heated to 75° C. via a heating mantle under a nitrogen purge to carry out the graft polymerization of a vinyl-based stage. At 75° C., a 2% aqueous solution of potassium persulfate was charged batchwise to the vessel. The amount of potassium persulfate was 0.5 part based on the graft monomer mixture.

The addition of 30 parts of a monomer mixture containing 73 parts styrene, 24 parts acrylonitrile and 3 parts divinylbenzene was started and continued uniformly over 3 hours. The reaction temperature was maintained at 75° C. for 3 hours after the addition of the monomer feed. The reaction was allowed to cool under ambient conditions.

To a separate reactor equipped as described above was charged an aqueous solution containing one part magnesium sulfate and 99 parts deionized water. The volume of the aqueous magnesium sulfate solution was two times the volume of latex to be isolated. The temperature of the reactor was raised to 85° C. via a heating mantle. The latex from the first reactor was filtered and added to the reactor containing the stirred magnesium sulfate solution in order to flocculate the latex. The mixture was filtered via a Tolhurst centrifuge, rinsing the polymer with copious amounts of deionized water. The polymer powder was dried for 3 days in a vacuum oven at 60° C. at −25 in. Hg.

EXAMPLE 2

The procedure and formulation of Example 1 were used except that the 30 part feed monomer mixture of the subsequent grafting stage was 73 parts styrene, 24 parts methacrylamide and 3 parts divinylbenzene.

EXAMPLE 3

The procedure and formulation of Example 1 were used except that the feed monomer mixture of the subsequent grafting stage was 99 parts styrene and 1 part divinylbenzene.

EXAMPLE 4

The polydiorganosiloxane/polystyrene latex substrate was prepared in accordance with Example 1 but differed in that two subsequent grafting stages were produced. For each grafting stage, 15 parts of vinyl monomer mixture was graft polymerized in emulsion onto the substrate latex which corresponded to 70 parts of the polydiorganosiloxane/polystyrene substrate. During the first stage, 15 parts of a monomer mixture comprised of 99 parts ethyl acrylate and 1 part divinylbenzene was fed uniformly over 1½ hours. At the end of this stage, a second feed containing 99 parts styrene and 1 part divinylbenzene was uniformly fed over a period of 1½ hours.

EXAMPLE 5

The procedure and formulation of Example 4 were used except that the feed monomer mixture of the first grafting stage was 99 parts butyl acrylate and 1 part divinylbenzene.

EXAMPLE 6

The procedure and formulation of Example 4 were used except that the substrate vinyl monomers (1.26 parts) comprised a mixture containing 98 parts styrene and 2 parts divinylbenzene. Two grafting stages were employed as in Example 4, except that the first was prepared from 15 parts of a monomer mixture containing 99 parts styrene and 1 parts divinylbenzene, and the second from 15 parts of a mixture containing 49 parts styrene, 50 parts methacrylonitrile and 1 part divinylbenzene.

EXAMPLE 7

The procedure and formulation of Example 4 were used except that the 15 part monomer mixture of the second grafting stage was 49 parts styrene, 50 parts acrylonitrile and 1 part divinylbenzene.

EXAMPLE 8

The procedure and formulation of Example 1 was used except that the 30-part monomer mixture of the first grafting stage was 98 parts methyl methacrylate and 2 parts divinylbenzene.

EXAMPLE 9

The procedure and formulation of Example 1 were used except that the grafting stage was prepared from 23.1 parts of a monomer mixture containing 59.6 parts methyl methacrylate, 37.4 parts methacrylonitrile and 3 parts divinylbenzene, the latter being charged to the monomer feed at the beginning of the last hour thereof.

EXAMPLE 10

The procedure and formulation of Example 9 were used except the feed monomer mixture of the grafting stage comprised 60.9 parts methacrylic acid, 36.1 parts acrylonitrile and 3 parts divinylbenzene. The divinylbenzene was present at the beginning of the monomer feed. In addition the surfactant, GAFAC RE610, was omitted and the pH of the substrate latex remained at about 1.5 during the subsequent grafting stage.

EXAMPLE 11

The procedure and formulation of Example 10 were used except that the feed monomer mixture of the grafting stage contained 96.7 parts methacrylamide and 3.3 parts divinylbenzene. The monomer mixture was dissolved in deionized water as an 18% solution to facilitate a uniform addition to the substrate latex.

EXAMPLES 12-22

The polydiorganosiloxane-based impact modifiers prepared according to the procedures and formulations of Examples 1-11 were each melt blended at concentrations of 10 weight percent with polyetherimide molding resin in the following manner: A dry blend of 90 weight percent of polyetherimide and 10 weight percent impact modifier (SIM) was tumble mixed on a jar shaker to give a homogeneous dispersion. The well-mixed dry blend was then extruded on a Welding Engineers 28 mm. twin-screw extruder under typical conditions for the polyetherimide molding resin. The extrudate was pelletized, dried and injection molded into test specimens on a 77 ton Battenfeld molding machine.

Tables 1-3 summarize the mechanical properties of Examples 12-22 as a function of the vinyl polymer stage(s). Examples of both single and multi-stage impact modifiers are included. In all cases the presence of the polydiorganosiloxane-based impact modifier yielded an improvement in the impact strength of the base polyetherimide molding resin (see the control in Table 3).

TABLE 1

| Example | 12 | 13 | 14 | 15 | 16 |
|---|---|---|---|---|---|
| SIM example | 1 | 2 | 3 | 4 | 5 |
| First grafting stage composition: | | | | | |
| Styrene | 73 | 73 | 99 | — | — |
| Ethyl acrylate | — | — | — | 49.5 | — |
| Butyl acrylate | — | — | — | — | 49.5 |
| Acrylonitrile | 24 | — | — | — | — |
| Methacrylamide | — | 24 | — | — | — |
| Divinylbenzene | 3 | 3 | 1 | 0.5 | 0.5 |
| Second grafting stage composition: | | | | | |
| Styrene | — | — | — | 49.5 | 49.5 |
| Divinylbenzene | — | — | — | 0.5 | 0.5 |
| Notched Izod (25° C.), ft.-lb./in., 10 mil | 4.3 | 1.8 | 1.3 | 3.0 | 1.9 |
| Dynatup (30° C.), ft.-lb.: | | | | | |
| Total energy | 37.8 | 8.8 | — | 6.1 | 7.5 |
| Energy at maximum load | 29.6 | 6.3 | — | 4.2 | 4.2 |
| Molding conditions: | | | | | |
| Average barrel set (°C.) | 371 | 343 | 371 | 371 | 371 |
| Mold surface temp. (°C.) | 114 | 107 | 114 | 114 | 114 |

TABLE 2

| Example | 17 | 18 | 19 | 20 | 21 | 22 |
|---|---|---|---|---|---|---|
| SIM example | 6 | 7 | 8 | 9 | 10 | 11 |
| First grafting stage composition: | | | | | | |
| Styrene | 49.5 | — | — | — | — | — |
| Methyl methacrylate | — | — | 98 | 59.6 | — | — |
| Ethyl acrylate | — | 49.5 | — | — | — | — |
| Acrylonitrile | — | — | — | — | 36.1 | — |
| Methacrylonitrile | — | — | — | 37.4 | — | — |
| Methacrylamide | — | — | — | — | — | 96.7 |
| methacrylic acid | — | — | — | — | 60.9 | — |
| Divinylbenzene | 0.5 | 0.5 | 2 | 3 | 3 | 3.3 |
| Second grafting stage composition: | | | | | | |
| Styrene | 24.5 | 24.5 | — | — | — | — |
| Methacrylonitrile | 25 | — | — | — | — | — |
| Acrylonitrile | — | 25 | — | — | — | — |
| Divinylbenzene | 0.5 | 0.5 | — | — | — | — |
| Notched Izod (25° C.), ft.-lb./in., 10 mil | 2.3 | 2.7 | 4.3 | 3.5 | 1.3 | 1.5 |
| Dynatup (30° C.), ft.-lb.: | | | | | | |
| Total energy | 39.4 | 7.8 | 49.9 | 42.2 | 8.9 | 7.2 |
| Energy at maximum load | 38.1 | 4.5 | 33.4 | 37.2 | 7.2 | 3.6 |
| Molding conditions: | | | | | | |
| Average barrel set (°C.) | 371 | 371 | 366 | 343 | 343 | 343 |
| Mold surface temp. (°C.) | 114 | 114 | 94 | 107 | 107 | 107 |

TABLE 3

| Example | 23 | 24 | 25 | 26 | 27 | Control |
|---|---|---|---|---|---|---|
| SIM example | 1 | 1 | 1 | 8 | 8 | — |
| Weight % | 5 | 7 | 10 | 5 | 10 | 0 |
| Notched Izod (25° C.), (ft.-lb./in.): | | | | | | |

TABLE 3-continued

| Example | 23 | 24 | 25 | 26 | 27 | Control |
|---|---|---|---|---|---|---|
| 10 mil | 1.5 | 2.8 | 4.3 | 1.9 | 4.6 | 0.6 |
| 40 mil | 6.3 | 9.2 | 10.7 | — | — | — |
| Dynatup (30° C.), (ft.-lb.): | | | | | | |
| Total energy | 46.2 | 43.7 | 41.7 | 47.0 | 49.9 | 4.7 |
| Energy at maximum load | 39.8 | 39.9 | 37.6 | 42.0 | 33.4 | 4.4 |
| Dynatup (0° C.), ft.-lb.: | | | | | | |
| Total energy | 28.0 | 46.4 | 40.5 | — | — | 2.75 |
| Energy at maximum load | 24.0 | 42.0 | 33.2 | — | — | 2.6 |
| Heat deflection temp. (264 psi) (°C.) | 185.6 | 182.5 | 185.1 | — | — | 189.5 |
| Molding conditions average barrel set (°C.) | 343 | 343 | 343 | 366 | 366 | 343 |
| Mold surface temp (°C.) | 121 | 121 | 121 | 93.3 | 93.3 | 121 |

EXAMPLES 23-27

The multi-stage graft polymers of Examples 1 and 8 were each melt blended at concentrations of 4-10 weight percent with polyetherimide molding resin as described in Examples 12-22.

EXAMPLE 28

Figure 2:
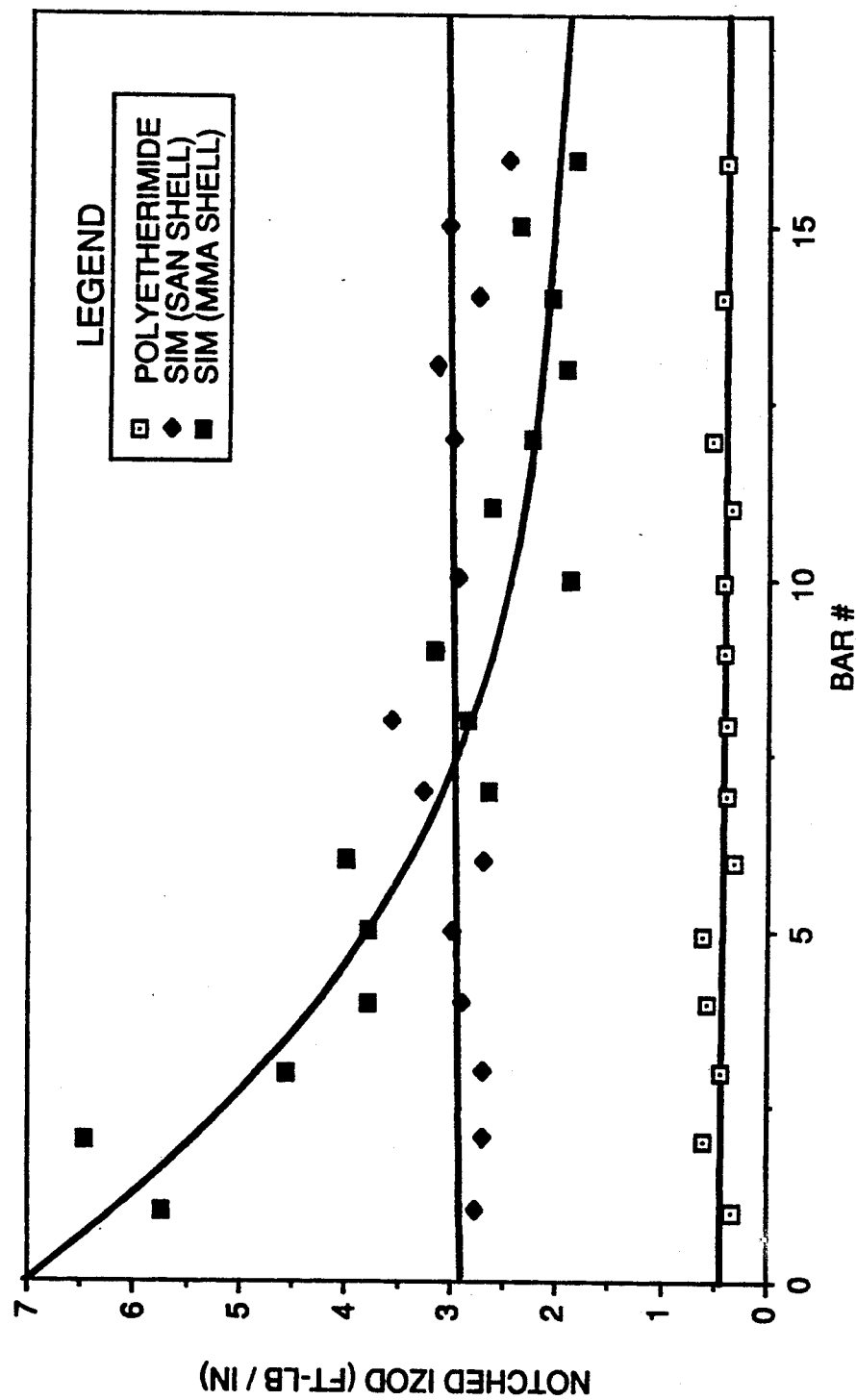
FIG. 2 is a similar graph for a 10 minute period.
Figure 3:
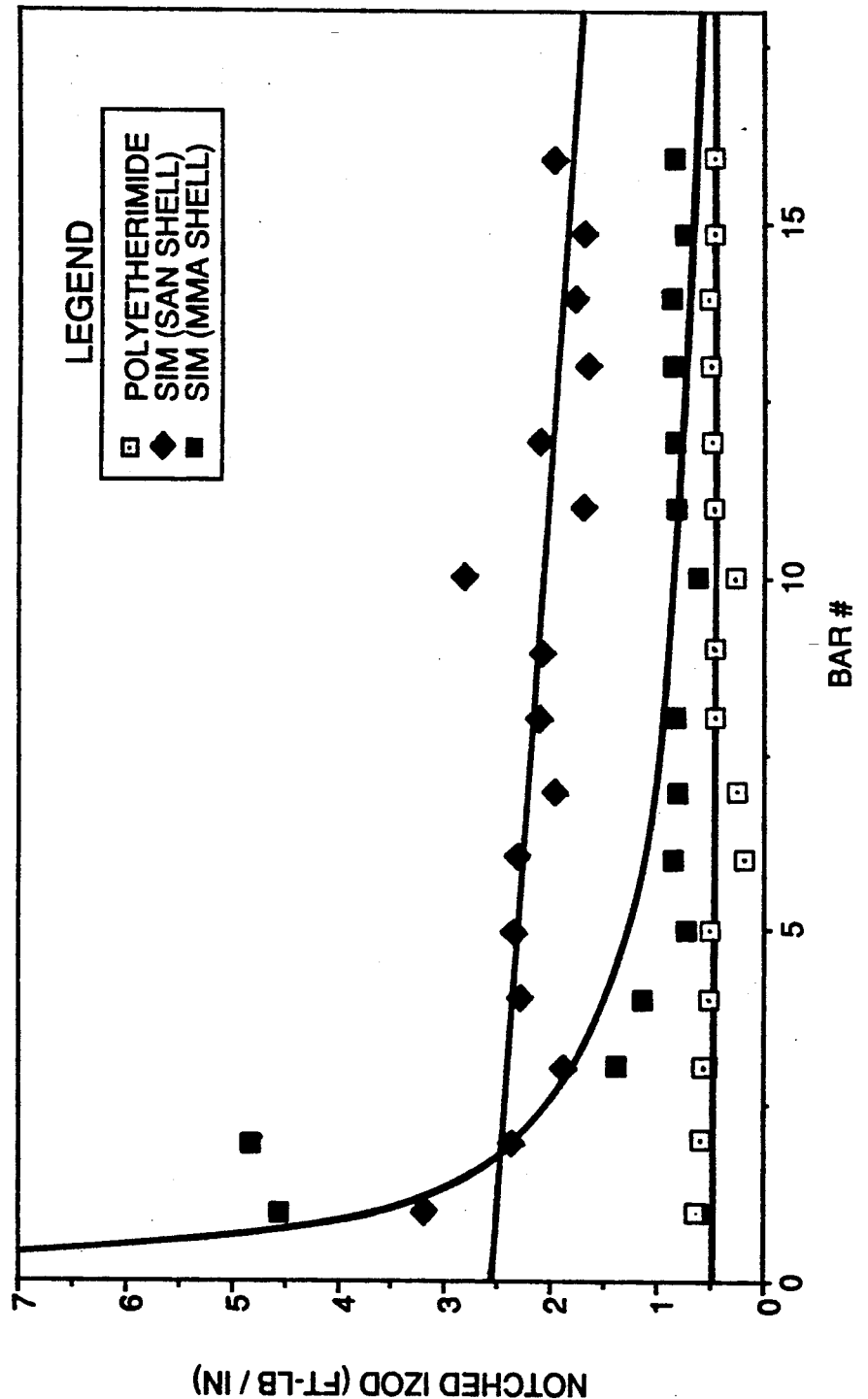
FIG. 3 is a graph similar to FIG. 1 for a temperature of 400° C.

The multi-stage graft polymers of Examples 1 and 8 were each melt blended at 10 weight percent with polyetherimide molding resin as described in Examples 11-22 except that, after extrusion, the dried pelletized blends were molded on a 28 ton Engle molding machine under various barrel set temperatures and cycle times. The samples were molded into ⅛ inch Izod bars with an ASTM standard part mold set on the 28 ton Engle molder. The mold surface temperature was 138° C. Determination of barrel capacity indicated that approximately six Izod bars must be molded to exhaust the barrel of material. Molding bars in a sequence at specified temperature and cycle time resulted in Izod bars subjected to molding barrel melt temperatures for increasing time periods up to bar 7. Equilibrium residence time was reached at bar 7, hence the resin for bars 7-16 was in the melt at a specified temperature for a maximum cycle time. Two mold barrel temperatures were examined (343° C. and 399° C.) in combination with two different equilibrium mold cycle times (2.66 minutes and 10 minutes). The ductilities of the polyetherimide modified with two different polydiorganosiloxane-based impact modifiers under various molding set conditions are illustrated in FIGS. 1-4.

EXAMPLE 29

The procedure and formulation of Example 1 were used except that the 23.1 parts of a subsequent grafting stage monomer mixture were emulsion graft polymerized onto 76.9 parts of the polydiorganosiloxane/polystyrene substrate. The 23.1 parts feed monomer mixture contained 73 parts styrene, 24 parts acrylonitrile and 3 parts divinylbenzene.

EXAMPLE 30

The procedure and formulation of Example 29 were used except that the addition of surfactant was omitted and the pH of the polydiorganosiloxane/polystyrene substrate latex remained at 1.5.

EXAMPLE 31

The procedure and formulation of Example 1 were used except that the addition of surfactant was omitted and the pH of the polydiorganosiloxane/polystyrene substrate latex remained at 1.5.

EXAMPLE 32

The procedure and formulation of Example 1 were used except that 45 parts of the monomer mixture were emulsion graft polymerized onto 55 parts of the polydiorganosiloxane/polystyrene substrate. The 45 parts monomer mixture contained 73 parts styrene, 24 parts acrylonitrile and 3 parts divinylbenzene.

EXAMPLE 33-37

The impact modifiers of Examples 1 and 29-32, having various substrate to grafting stage weight ratios, were each melt blended at 10 weight percent with the polyetherimide molding resin as described in Examples 12-22. The results are summarized in Table 4. The enhancement in impact strength was maintained over a broad range of such ratios. As the substrate to grafting stage weight ratio decreased the weight percent polydiorganosiloxane in the blend decreased.

TABLE 4

| Example | 33 | 34 | 35 | 36 | 37 |
|---|---|---|---|---|---|
| SIM example | 29 | 30 | 1 | 31 | 32 |
| Substrate/grafting stage ratio | 76.9/23.1 (3.33) | 76.9/23.1 (3.33) | 70/30 (2.33) | 70/30 (2.33) | 55/45 (1.22) |
| Notched Izod (25° C.) ft.-lb./in., | 3.8 | 3.5 | 3.5 | 4.0 | 2.8 |
| 10 mil Dynatup (30° C.), ft.-lb: | | | | | |
| Total energy | 41.5 | 39.2 | 44.7 | 42.4 | 30.5 |
| Energy at maximum load | 33.3 | 33.4 | 41.3 | 37.9 | 18.5 |
| Molding conditions: | | | | | |
| Average barrel set (°C.) | 343 | 343 | 371 | 371 | 343 |
| Mold surface temp. (°C.) | 107 | 107 | 110 | 110 | 107 |

EXAMPLE 38

The procedure and formulation of Example 1 were used except that the 30 parts feed monomer mixture of the grafting stage was 87 parts styrene, 10 parts acrylonitrile and 3 parts divinylbenzene.

EXAMPLE 39

The procedure and formulation of Example 1 was used except that the 30 parts feed monomer mixture of the grafting stage was 48.5 parts styrene, 48.5 parts acrylonitrile and 3 parts divinylbenzene.

EXAMPLES 40-43

The impact modifiers of Examples 1, 3, 38 and 39 were each melt blended at 10 weight percent with the polyetherimide molding resin as described in Examples 12-22. The mechanical property results are summarized in Table 5. Impact strength increased with the addition of acrylonitrile up to a maximum near the azeotropic mixture for the polymerization of these two monomers.

TABLE 5

| Example | 40 | 41 | 42 | 43 |
|---|---|---|---|---|
| SIM example | 3 | 38 | 1 | 39 |
| Subsequent stage composition (parts by wt.): | | | | |
| Styrene | 99 | 87 | 73 | 48.5 |
| Acrylonitrile | 0 | 10 | 24 | 48.5 |
| Divinylbenzene | 1 | 3 | 3 | 3 |
| Notched Izod (25° C.), ft.-lb./in, 10 mil | 1.27 | 2.1 | 3.8 | 2.5 |
| Dynatup (30° C.), ft.-lb.: | | | | |
| Total energy | — | 29.9 | 40.5 | 36.7 |
| Energy at maximum load | — | 20.2 | 34.6 | 31.5 |
| Dynatup (−30° C.), ft.-lb.: | | | | |
| Total energy | — | 37.2 | 44.3 | 34.6 |
| Energy at maximum load | — | 34.2 | 38.2 | 31.3 |
| Molding conditions: | | | | |
| Average barrel set (°C.) | 371 | 371 | 371 | 371 |
| Mold surface temp. (°C.) | 113 | 117 | 117 | 117 |

EXAMPLE 44

The procedure and formulation of Example 1 were used except that the diorganosiloxane monomer mixture for the substrate latex contained 89.6 parts octamethylcyclotetrasiloxane and 10.37 parts tetraethoxysilane.

EXAMPLE 45

The procedure and formulation of Example 1 were used except that 25.88 parts of diorganosiloxane monomer mixture contained 88.3 parts of octamethylcyclotetrasiloxane, 10.26 parts of tetraethoxysilane and 1.4 parts of methacryloxypropyltriethoxysilane.

EXAMPLE 46

The procedure and formulation of Example 1 were used except that 25.88 parts of diorganosiloxane monomer mixture contained 85.9 parts of octamethylcyclotetrasiloxane, 9.97 parts of tetraethoxysilane and 4.1 parts of 2,4,6,8-tetramethyltetravinylcyclotetrasiloxane.

EXAMPLES 47–49

The impact modifiers of Examples 1 and 44–46 were each melt blended at a 10% by weight level with polyetherimide molding resin according to the procedure described in Examples 12–22. The resultant data are set forth in Table 6.

TABLE 6

| Example | 47 | 48 | 49 | 50 |
|---|---|---|---|---|
| SIM example | 1 | 44 | 45 | 46 |
| Siloxane monomer mixture (parts by weight) | | | | |
| Octamethylcyclotetrasiloxane | 84.7 | 89.6 | 88.3 | 85.9 |
| Tetraethoxysilane | 9.8 | 10.37 | 10.26 | 9.97 |
| 2,4,6,8-Tetramethyltetravinylcyclotetrasiloxane | 4.0 | 0.0 | 0.0 | 4.1 |
| Methacryloxytriethoxysilane | 1.4 | 0.0 | 1.4 | 0.0 |
| Notched Izod (25° C.), ft.-lb./in., 10 mil | 4.3 | — | 2.7 | 3.2 |
| Dynatup (30° C.), ft.-lb: | | | | |
| Total energy | 46.7 | — | 38.4 | 41.3 |
| Energy at maximum load | 44.8 | — | 35.8 | 35.1 |
| Dynatup (−30° C.), ft.-lb.: | | | | |
| Total energy | 42.4 | — | 39.9 | 45.0 |
| Energy at maximum load | 34.6 | — | 37.8 | 39.6 |

TABLE 6-continued

| Example | 47 | 48 | 49 | 50 |
|---|---|---|---|---|
| Molding conditions: | | | | |
| Average barrel set (°C.) | 371 | — | 371 | 371 |
| Mold surface temp. (°C.) | 117 | — | 117 | 117 |

EXAMPLE 50

The procedure and formulation of Example 31 were used except that after homogenization the reaction mixture was heated to 85° C. and 0.23 parts of a 2% aqueous solution of potassium persulfate was charged to the vessel. The remaining 0.88 parts of the potassium persulfate solution was fed uniformly over 3 hours. The reaction temperature was quenched to 4° C. with an ice/water bath at the end of 3 hours. The temperature was maintained at 4° C. for 5.5 hours. At the end of the 5.5 hours equilibration time the temperature was raised to 75° C. for the subsequent stage reaction according to the procedure and formulation described in Example 1.

EXAMPLE 51

The procedure and formulation of Example 50 were used except that the equilibration temperature was maintained at 40° C. for 17 hours.

EXAMPLE 52

The procedure and formulation of Example 31 were used except that after the 6 hour simultaneous vinyl monomer siloxane monomer polymerization at 75° C., the polydiorganosiloxane/polystyrene substrate latex was quench cooled with an ice/water bath to 22° C. The equilibration temperature was maintained at 22° C. for 17 hours prior to the grafting stage.

EXAMPLE 53

The procedure and formulation of Example 1 were used except that the polydiorganosiloxane/polystyrene substrate was prepared by a slow addition technique. To a reaction vessel, as described in Example 1, was charged 69.35 parts of distilled water and 0.36 parts of dodecylbenzenesulfonic acid. No homogenization step was used in this procedure. The solution was purged for 30 minutes with nitrogen and heated to 75° C. via a heating mantle. The purge was stopped and 0.18 parts of a 2% aqueous solution of potassium persulfate was charged. The addition of 29.38 parts of monomer mixture containing 25.88 parts of a polydiorganosiloxane mixture and 3.5 parts of a vinyl monomer as in Example 1 was started and continued uniformly over 4 hours. Aqueous potassium persulfate was charged incrementally at the end of hours 1, 2, 3 and 4 in aliquots of 0.18 part. At the end of the monomer feed, the substrate latex was heated an addition 4 hours at 75° C. The subsequent grafting stage reaction was in accordance with the procedure and formulation of Example 1

EXAMPLE 54–58

Blends of 90% polyetherimide molding resin and 10% polydiorganosiloxane-based impact modifier of Example 1 and Examples 50–53 were each prepared as described in Examples 12–22. Table 7 illustrated the performance of the in the matrix resin as a function of the synthetic procedure.

TABLE 7

| Example | 54 | 55 | 56 | 57 | 58 |
|---|---|---|---|---|---|
| SIM example | 1 | 50 | 51 | 52 | 53 |
| Notched Izod (25° C.), ft.-lb./in., 10 mil | 4.0 | 3.5 | 3.3 | 1.7 | 3.8 |
| Dynatup (30° C.), ft.-lb: | | | | | |
| Total energy | 42.4 | 43.6 | 42.7 | 32.9 | 39.3 |
| Energy at maximum load | 37.9 | 40.3 | 39.9 | 29.1 | 34.7 |
| Molding conditions: | | | | | |
| Average barrel set (°C.) | 371 | 371 | 371 | 371 | 371 |
| Mold surface temperature (°C.) | 111 | 111 | 111 | 111 | 112 |

EXAMPLE 59

The procedure and formulation of Example 1 were used except that 0.2 part potassium persulfate based upon 100 parts of vinyl monomer mixture was charged to the reactor for the subsequent stage. The potassium persulfate was charged as a 2% aqueous solution.

EXAMPLE 60

The procedure and formulation of Example 59 were used except that an additional 0.2 part potassium persulfate based on 100 parts of vinyl monomer mixture was charged at the end of the vinyl monomer feed. Again the potassium persulfate was added as a 2% aqueous solution.

EXAMPLE 61

The procedure and formulation of Example 60 were used except that 0.1 part potassium persulfate based on 100 parts vinyl monomer mixture was charged prior to the feed of the monomer mixture for the subsequent stage and an additional 0.1 part potassium persulfate based on 100 parts vinyl monomer mixture was charged at the end of the feed.

EXAMPLE 62

The procedure and formulation of Example 1 was used except that an alternate free radical initiating system was used for the subsequent stage. The initiating system contained 0.2 part t-butyl hydroperoxide and 0.1 part sodium formaldehyde sulfoxylate based on 100 parts monomer feed in the subsequent stage and 1 ppm. ferrous II sulfate based on the total amount of impact modifier latex prior to isolation. The polymerization temperature for the subsequent grafting stage reaction was 40° C. Ferrous sulfate was charged to the reaction mixture as a $1 \times 10^{-2}$ aqueous solution. Using separate feed pumps, a 0.1% aqueous solution of sodium formaldehyde sulfoxylate was uniformly charged over 3.5 hours, a 0.2% aqueous solution of t-butyl hydroperoxide was charged uniformly over 3.5 hours and a monomer mixture of 74 parts styrene, 24 parts acrylonitrile and 3 parts divinylbenzene was charged over 3 hours. The reaction was heated at 40° C. for a total of 7 hours.

EXAMPLE 63

The procedure and formulation of Example 60 were used except that an alternate redox free radical initiating system was used for the subsequent grafting stage. The redox system contained 0.4 part sodium persulfate and 0.4 part sodium metabisulfite based on 110 parts of subsequent stage monomer feed stock and 0.2 ppm. ferrous sulfate based on the total amount of impact modifier latex prior to isolation. At 40° C., a $1 \times 10^{-2}\%$ aqueous solution of ferrous sulfate was charged to the substrate latex. Immediately following the charge of ferrous sulfate, 2% aqueous solutions of sodium persulfate and sodium metabisulfite were each charged batchwise. The monomer feed of 73 parts styrene, 24 parts acrylonitrile and 3 parts divinylbenzene was then begun and continued uniformly for over 3 hours.

EXAMPLES 64–69

Blends of 90% polyetherimide molding resin and 10% polydiorganosiloxane-based impact modifier which had the subsequent grafting stage initiated with different free radical sources (Examples 1, 59–63) were each prepared as described in Example 12–22. The results of the impact performance are summarized in Tables 8–9.

TABLE 8

| Example | 64 | 65 | 66 |
|---|---|---|---|
| SIM example | 1 | 59 | 60 |
| Initiating system* | KPS | KPS | KPS |
| Notched Izod, (25° C.), ft.-lb./in., 10 mil | 4.3 | 4.6 | 3.9 |
| Dynatup (30° C.), ft.-lb.: | | | |
| Total energy | 46.7 | 42.4 | 40.2 |
| Energy at maximum load | 44.2 | 36.1 | 31.5 |
| Dynatup (−30° C.), ft.-lb.: | | | |
| Total energy | 42.4 | 44.4 | — |
| Energy at maximum load | 34.6 | 39 | — |
| Molding conditions: | | | |
| Average barrel set (°C.) | 371 | 371 | 371 |
| Mold surface temperature (°C.) | 117 | 117 | 117 |

*KPS = Potassium persulfate, TBHP-90 = t-butyl hydroperoxide,
SFS = sodium formaldehyde sulfoxylate,
FS = ferrous sulfate,
NAPS = sodium persulfate,
NAMBS = sodium metabisulfite.

TABLE 9

| Example | 67 | 68 | 69 |
|---|---|---|---|
| SIM example | 61 | 62 | 63 |
| Initiating system* | KPS | TBHP-90 SFS FS | NaPS NaMBS FS |
| Notched Izod, (25° C.), ft.-lb./in., 10 mil | 4.2 | 2.5 | 3.0 |
| Dynatup (30° C.), ft.-lb. | | | |
| Total energy | 41.5 | 40.3 | 3.0 |
| Energy at maximum load | 33.5 | 31.8 | 29.4 |
| Dynatup (−30° C.), ft.-lb. | | | |
| Total energy | 42.1 | 34.5 | 32.6 |
| Energy at maximum load | 33.3 | 26.2 | 22.4 |
| Molding conditions | | | |
| Average barrel set (°C.) | 371 | 371 | 371 |
| Mold surface temperature (°C.) | 117 | 117 | 117 |

*KPS = Potassium persulfate, TBHP-90 = t-butyl hydroperoxide,
SFS = sodium formaldehyde sulfoxylate,
FS = ferrous sulfate,
NAPS = sodium persulfate,
NAMPS = sodium metabisulfite.

EXAMPLE 70

The procedure and formulation of Example 1 were used except that the styrene and divinylbenzene were omitted from the initial 29.38 parts first stage monomer mixture. This mixture contained only siloxane monomers. The incremental addition of potassium persulfate was also omitted during the first stage.

EXAMPLE 71

The procedure and formulation of Example 1 were used except that the initial 29.33 parts first stage monomer mixture contained 3.5 parts of a vinyl monomer mixture containing by weight 73.5 parts styrene, 24.5 parts acrylonitrile and 2 parts divinybenzene.

EXAMPLES 72-74

The polydiorganosiloxane-based impact modifiers prepared according to the procedures and formulation of Examples 2, 72 and 73 were each melt blended at concentrations of 10 weight percent with polyetherimide molding resin according to the method described in Examples 12-22. The results are summarized in Table 10.

TABLE 10

| Example | 72 | 73 | 74 |
| --- | --- | --- | --- |
| SIM example | 1 | 70 | 71 |
| First stage monomer mixture: | | | |
| A. Siloxane monomer Mixture | 25.88 | 29.38 | 25.88 |
| B. Vinyl monomer mixture | 3.5 | — | 3.5 |
| Styrene | 98.0 | — | 73.5 |
| Acrylonitrile | — | — | 24.5 |
| Dinvinylbenzene | 2.0 | — | 2.0 |
| Notched Izod (25° C.), ft.-lb./in. 10 mil | 5.4 | 4.3 | 3.8 |
| Dynatup (30° C.), ft.-lb.: | | | |
| Total energy | 43.0 | 38.4 | 16.0 |
| Energy at maximum load | 37.2 | 30.2 | 7.5 |
| Molding conditions: | | | |
| Average barrel set (°C.) | 371 | 371 | 371 |
| Mold surface temperature (°C.) | 126 | 126 | 126 |

What is claimed is:

1. A composition comprising a polyimide in combination with a sufficient amount to improve the impact resistance of the polyimide of an impact modifier comprising a graft polymer having:
   (a) as a first stage, an elastomeric polydiorganosiloxane and the polymerization product of silicon-free vinyl monomer, both formed by simultaneous polymerization, and
   (b) at least one subsequent stage graft polymerized in the presence of any previous stages, said subsequent graft polymerized stage comprising polymers selected from the group consisting of copolymers of acrylonitrile with vinyl aromatic monomers, copolymers of methacrylonitrile with vinyl aromatic monomers, homopolymers of vinyl aromatic monomers, homopolymers and copolymers of lower alkyl acrylates or methacrylates, homopolymers and copolymers of acrylamide or methacrylamide and homopolymers and copolymers of acrylic acid or methacrylic acid.

2. The composition of claim 1 wherein the polyimide has a melt extrusion temperature of from 300° C. to 400° C.

3. The composition of claim 1 wherein the subsequent graft polymerization stage of the impact modifier contains from 50% to 100% by weight of polymerized styrene and up to 50% by weight of polymerized acrylonitrile or methacrylonitrile.

4. The composition of claim 1 wherein the impact modifier contains from 30% to 99% by weight of said first stage and from 1% to 70% of said subsequent graft polymerized stage comprising a copolymer of acrylonitrile or methacrylonitrile with a vinyl aromatic monomer, said percentages being based on total impact modifier.

5. The composition of claim 1 wherein the impact modifier contains from 50% to 80% by weight of said first stage and from 20% to 50% of a styrene-acrylonitrile subsequent graft polymerized stage, said percentages being based on total impact modifier.

6. The composition of claim 5 wherein the subsequent graft polymerization stage contains from 50% to 90% by weight of styrene and from 10% to 50% by weight of acrylonitrile.

7. The composition of claim 1, wherein the first stage contains from 55% to 95% by weight of elastomeric polydiorganosiloxane and from 5% to 45% of polymerized silicon-free vinyl monomer, said percentages being based on polymerizable ingredients.

8. The composition of claim 1 comprising from 80% to 97% by weight of the polyimide and from 3% to 20% of the impact modifier, said percentages being based on total composition.

9. The composition of claim 8 comprising from 85% to 95% by weight of the polyimide and from 5% to 15% of the impact modifier, said percentages being based on total composition.

10. The composition of claim 1 wherein the subsequent graft polymerized stage monomers in the impact modifier include a crosslinking agent.

11. The composition of claim 10 wherein the crosslinking agent is divinylbenzene.

12. The composition of claim 1 wherein the subsequent graft polymerized stage monomers include a polymerized vinyl aromatic monomer.

13. The composition of claim 1 wherein the subsequent graft polymerized stage comprises a lower alkyl methacrylate homopolymer or copolymer.

14. The composition of claim 13 wherein the lower alkyl methacrylate is selected from the group consisting of methyl methacrylate and ethyl acrylate.

15. The composition of claim 1 wherein the subsequent graft polymerized stage comprises an acrylamide homopolymer or copolymer.

* * * * *